United States Patent [19]

Spurgeon

[11] 4,298,868
[45] Nov. 3, 1981

[54] ELECTRONIC DISPLAY APPARATUS

[76] Inventor: John R. Spurgeon, 4407 Pack Saddle Pass, Austin, Tex. 78745

[21] Appl. No.: 139,178

[22] Filed: Apr. 11, 1980

[51] Int. Cl.³ ............................................. G08B 5/36
[52] U.S. Cl. .................... 340/755; 273/1 E; 315/211; 358/241; 362/811; 340/805; 340/782
[58] Field of Search ................. 340/755; 362/35, 252, 362/811; 315/211; 273/1 E; 358/240, 241

[56] References Cited

U.S. PATENT DOCUMENTS

| | | |
|---|---|---|
| 704,513 | 7/1902 | Campbell ........................ 340/755 X |
| 1,550,036 | 8/1925 | McCann . |
| 1,800,054 | 4/1931 | Craig . |
| 1,904,901 | 4/1933 | Lawrence . |
| 1,940,500 | 12/1933 | Lawrence . |
| 3,154,636 | 10/1964 | Schwertz ........................ 340/755 X |
| 3,272,506 | 9/1966 | Lescher . |
| 3,737,647 | 6/1973 | Gomi . |
| 3,958,235 | 5/1976 | Duffy ............................ 340/755 X |
| 4,097,917 | 6/1978 | McCaslin . |
| 4,160,973 | 7/1979 | Berlin ............................ 358/241 X |

Primary Examiner—David L. Trafton
Attorney, Agent, or Firm—Pravel, Gambrell, Hewitt, Kirk, Kimball & Dodge

[57] ABSTRACT

An apparatus is provided to produce an optical illusion of variable geometric patterns. The apparatus may be used as an electronic toy, display or kinetic art mural, as well as a demonstration aid in geometry, physics or physiology. An array of light emitting diodes mounted on a rotating disk or carrier is selectively activated to control the geometric patterns formed.

9 Claims, 7 Drawing Figures

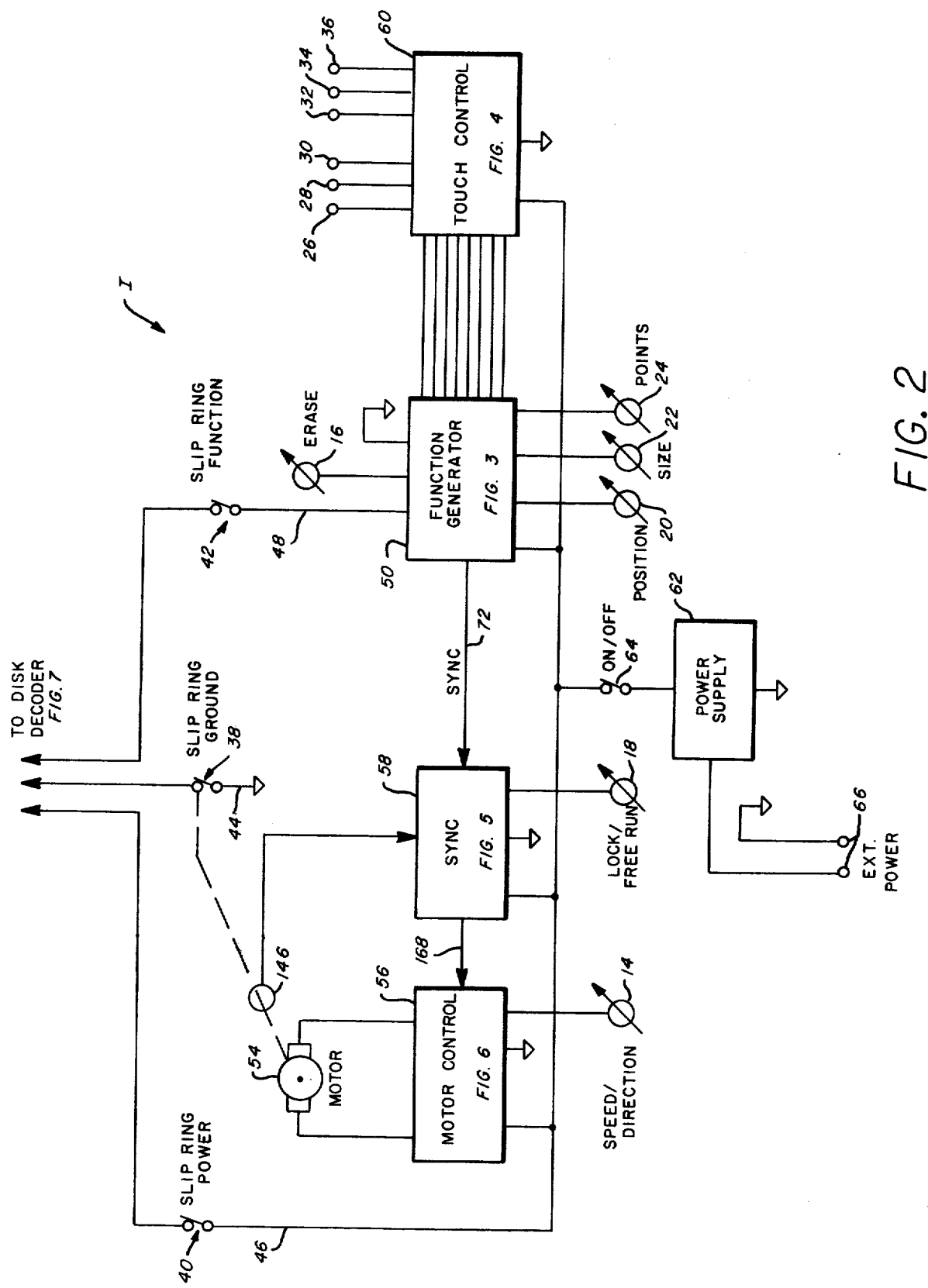

ELECTRONIC DISPLAY APPARATUS

BACKGROUND OF THE INVENTION

The present invention relates to forming variable patterns with lights.

Various prior patents have related to structures for forming different kaleidoscopic designs or other scintillating or shining images. Those known to applicant are U.S. Pat. Nos. 1,800,054; 1,904,901; 1,940,500; 1,550,036; 3,737,647; and 4,097,917. Another patent also known to applicant, U.S. Pat. No. 3,272,506 related the generation of the subjective effect of color to a viewer.

However, of these patents, U.S. Pat. No. 4,097,617 utilized fiber-optical rods and U.S. Pat. No. 3,737,647 was directed to light-emitting diodes for use with costumes and personal ornaments.

In U.S. Pat. Nos. 1,940,500 and 1,904,901 light bulbs were rotated within a cover member which had a number of jewels mounted thereon so that a sparkling visual effect was produced. U.S. Pat. No. 1,550,036 related to a rotatable disc which had a number of various colored lights mounted on it. As the disc rotated, the current intensity furnished to the various lights could be adjusted to vary the blend of the color apparent to a viewer, while different designs could apparently be superimposed on the colored revolving field.

In U.S. Pat. No. 1,800,054, a disk of light bulbs was varied in its speed of revolution according to a fixed operating cycle so that a certain pattern of images was visible to a viewer.

SUMMARY OF THE INVENTION

Briefly, the apparatus of the present invention forms visual images of various patterns, positions, sizes and shapes. A plurality of light emitting means are mounted on a disc which is rotated by a motor or other suitable means. An electronic control circuit selectively activates the light emitting means to form the images specified by the user.

An input circuit of the control circuit forms electronic signals defining the pattern, position, size and shape of the image specified by the user and a decoder circuit responds to the electronic signals from the input circuit to selectively activate the light emitting means and thus form the specified visual image.

BRIEF DESCRIPTION OF DRAWINGS

FIGS. 2 through 7, inclusive, are schematic electrical circuit diagrams of the apparatus of FIG. 1.

DESCRIPTION OF PREFERRED EMBODIMENT

Figure 1:
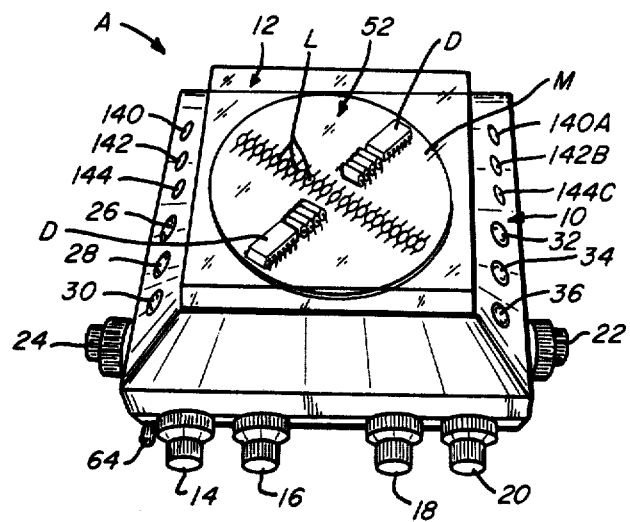
FIG. 1 is an isometric view of an apparatus according to the present invention.
Figure 7:
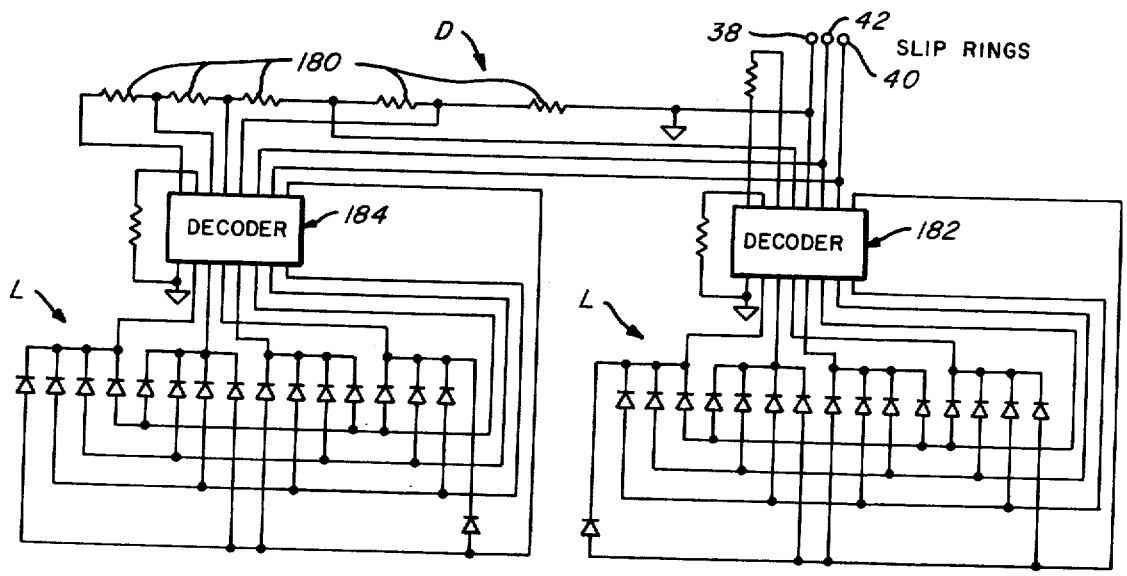
Figure 6:
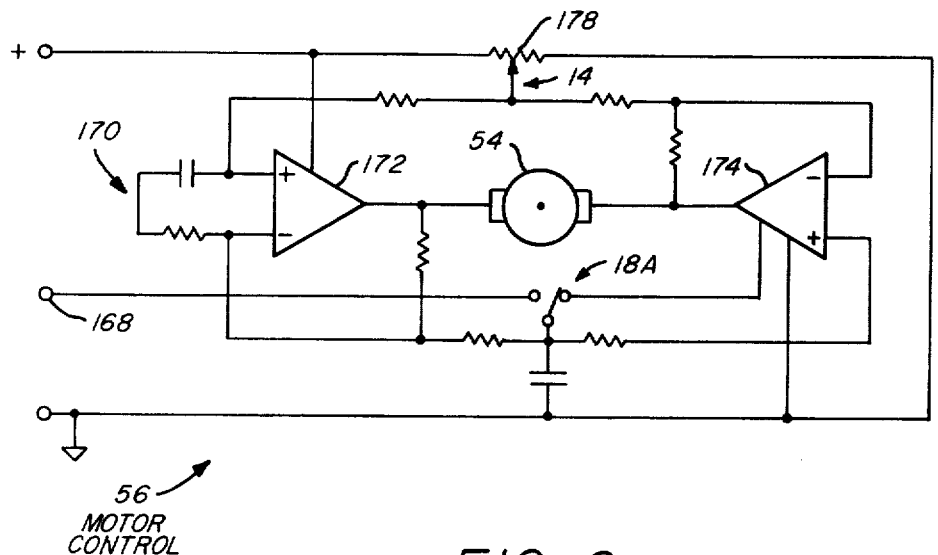
Figure 5:
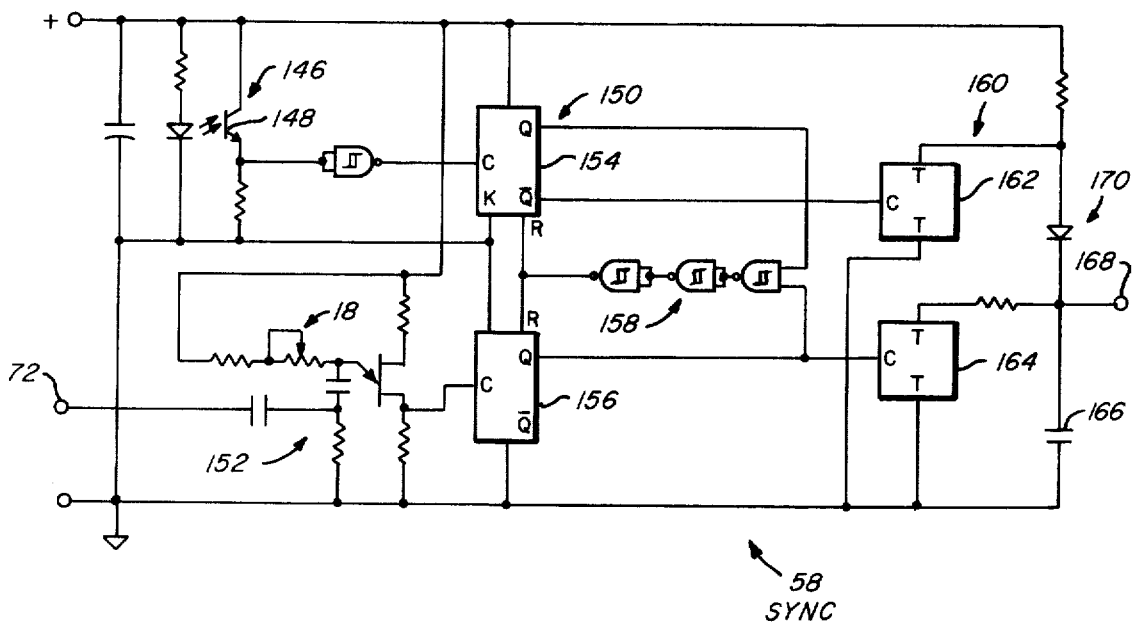

In the drawings, the letter A designates generally an apparatus according to the present invention for forming visual images of various patterns, position size and shape. The apparatus A includes a plurality of light emitting diodes L (FIGS. 1 and 7) which are mounted on a rotatable disk member M (FIG. 1). It should be understood that the light emitting diodes L may be replaced with liquid crystals or other suitable light emitting means, if desired. The light emitting means L may each be of the type emitting light of one color or may be of several different types, each emitting a certain one of a group of different colors of light if desired.

An electronic control circuit K (FIGS. 1-7) selectively activates the light emitting means L to form any of an almost countless variety of images specified by a user. An input circuit I (FIG. 2) of the control circuit K forms electronic signals defining the pattern, shape, position and size of the image specified by the user, and a decoder circuit D (FIGS. 1 and 7), preferably mounted on the rotatable disk member M with the light emitting means L, decodes the signals from the input circuit I and activates the light emitting means L to form the specified image.

As will be set forth in detail below, the input circuit I permits a user to adjust the pattern, or number of legs or points in the image; the size or area of the disk member M occupied by the image; the shape, defined in the present invention as whether the ends of the legs or points in the image are pointed, round or flat; the position or location on the disk member M where the image begins; and the texture or density of lights activated per unit area of the disk member M in forming the image.

Considering the apparatus A more in detail (FIG. 1), the disk member M is mounted in a container body or housing 10 of suitable configuration. Preferably, a transparent cover 12 of plastic or other synthetic resin is mounted with the housing 10 to enclose disk member M. Control knobs 14, 16, 18, 20, 22 and 24 are mounted at suitable locations on the housing 10 and permit a user of the apparatus A to provide control functions to the input circuit I, in a manner to be set forth, regarding the image to be formed. Touch control switches 26, 28, 30, 32, 34 and 36 are also mounted at suitable locations on the housing 10 to allow a user to further adjust the image formed by the apparatus A by means of the input circuit I. These touch contacts are of the type which respond to contact by a user's finger by sensing ambient electrical noise, often at sixty hertz frequency, usually present in the human body.

The disk member M is preferably made of printed circuit board material and is mounted at its center on a supporting shaft for rotating movement. Suitable slip rings 38, 40 and 42 (FIGS. 2 and 7) are formed either on the under side of the member M or on the shaft to permit electrical connection of the decoder circuit D with an electrical ground contact 44 or slip ring 38 (FIGS. 2 and 3), an operating power contact 46 or slip ring 40 and a function signal contact 48 or slip ring 42 connected to a function generator circuit 50 of the input circuit I.

The following chart explains the electrical connections made:

|  | DECODER D | INPUT I |
|---|---|---|
| GROUND | 38 | 44 |
| V+ | 40 | 46 |
| FUNCTION | 42 | 48 |

The decoder circuit D is electrically connected by suitable conductors on a face 52 of the disk M with the light elements L. The supporting shaft on which the disk M rotates is the output shaft of an electric motor 54 (FIGS. 2 and 6) within housing 10 which rotates the disk M in a clockwise or counterclockwise direction at a speed which is made variable in either direction, in a manner to be set forth. Thus the disk can be made to rotate either direction from zero to full speed of the motor controller range, and the control for varying the speed and direction is established by control knob 14 on the front panel.

Figure 3:
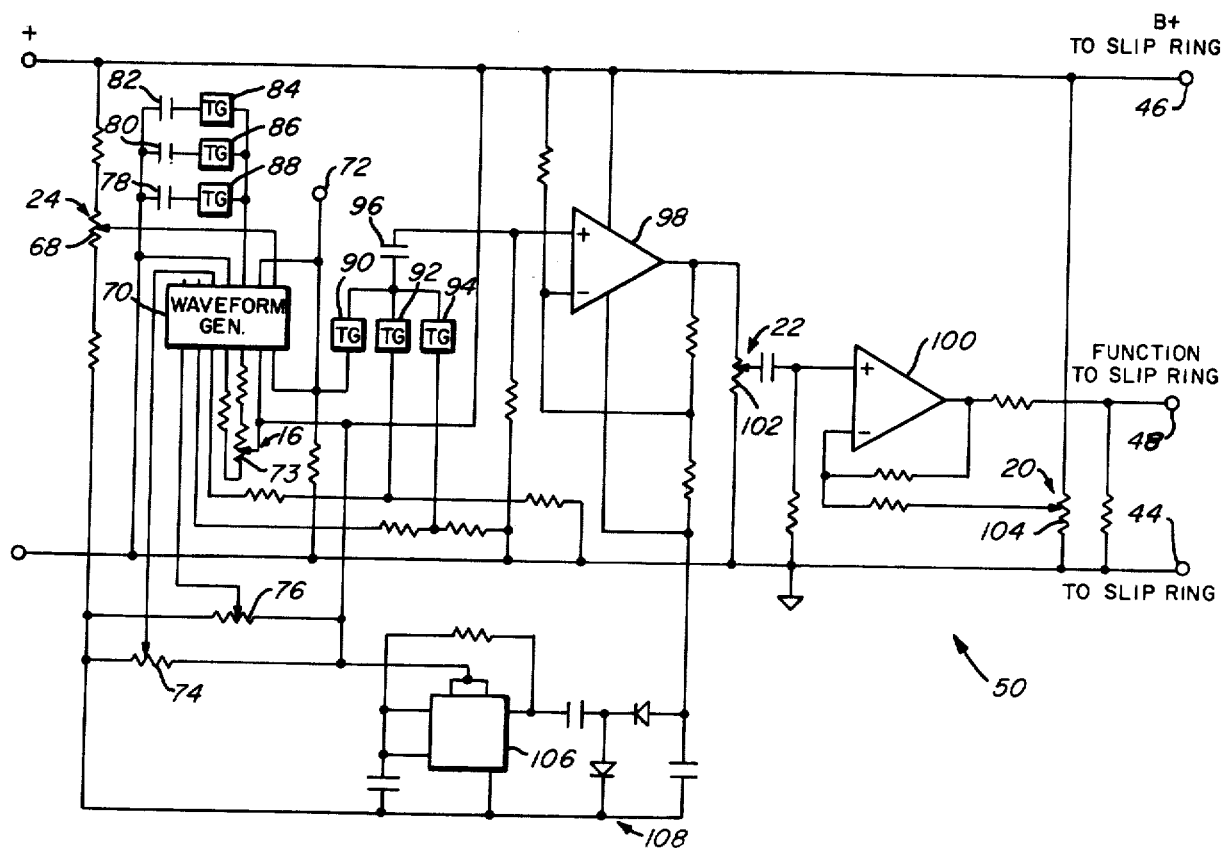
Figure 4:
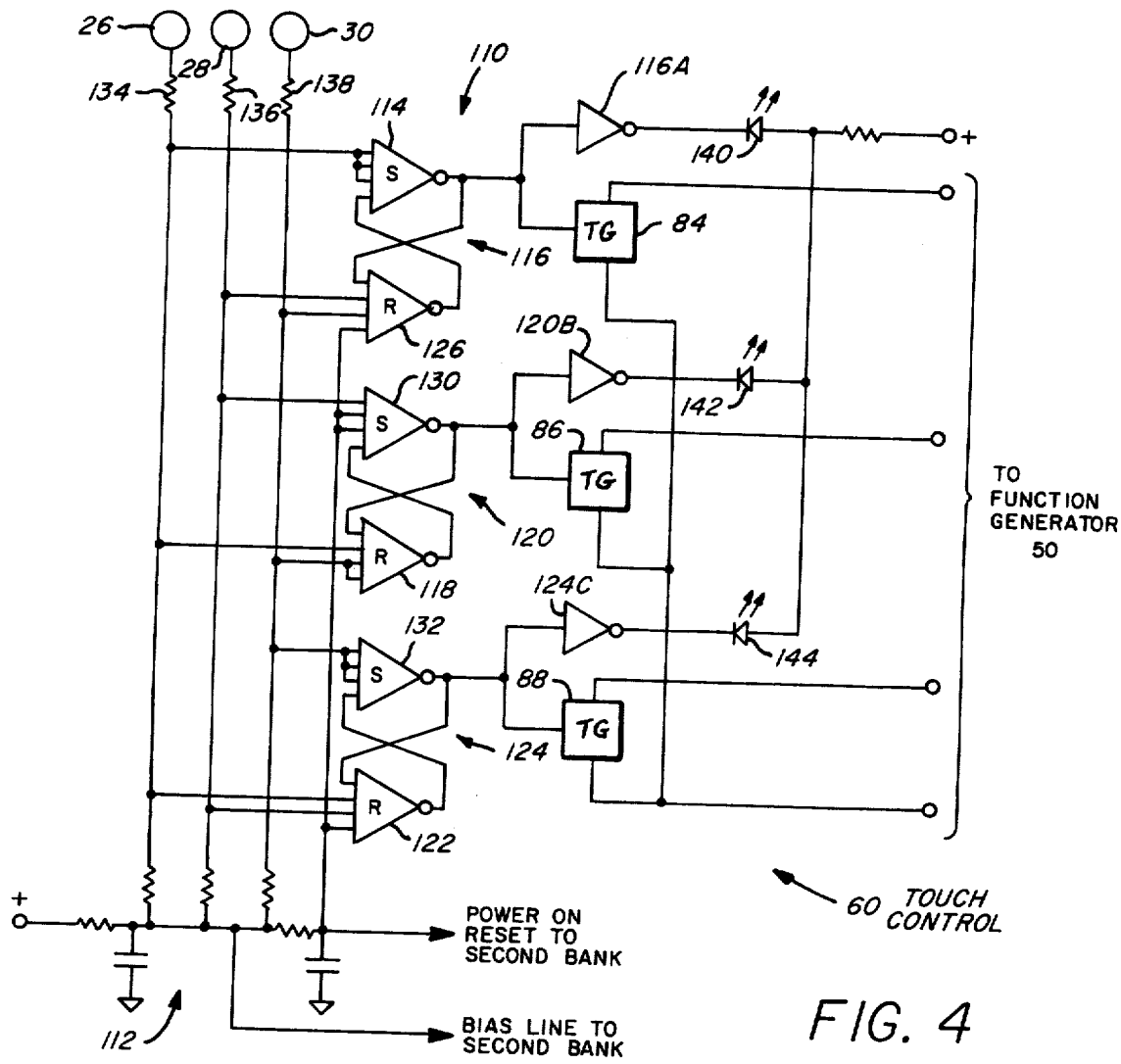

Considering now the input circuit I (FIG. 2) more in detail, a motor control circuit 56 (FIGS. 2 and 6), a synchronization or sync circuit 58 (FIGS. 2 and 5) and a touch control circuit 60 (FIGS. 2 and 4) are included in addition to the function generator circuit 50 (FIGS. 2 and 3). Operating power for the apparatus A is provided by a power supply 62 (FIG. 2) through an on-off switch 64. The power supply 62 is electrically connected at terminals 66 to a suitable power source, such as a battery or wall outlet for operation or recharging the power supply.

The function generator circuit 50 is electrically connected to the control knobs 16, 20, 22 and 24 mounted on the housing 10. Knob 24 controls the resistance of a potentiometer 68 (FIG. 3) of the function generator circuit 50 which is electrically connected as an input to an integrated circuit waveform generator 70 which produces any one of three basic waveforms: sine wave, triangular, and square waves. The square wave output from generator 70 is provided at a terminal 72 as an input to the sync circuit 58. The resistance of potentiometer 68 determines the output frequency of the signals formed in generator 70, and thus determines the number of legs or arms of the image formed by light emitters L on disk member M.

A potentiometer 73 whose resistance is controlled by the knob 16 on the housing 10 is electrically connected to the waveform generator 70 to vary the duty cycle of the waveforms formed by the generator 70 in effect performing an erase function to make it possible to vary the shape of the images and their texture. Two sine adjust potentiometers 74 and 76 are internal trimmers which adjust the sine wave output from generator 70 to a correct shape.

Three capacitors 78, 80 and 82 are connected to the transmission gates 84, 86 and 88, respectively, which are activated by the touch control circuit 60 in a manner to be set forth to select the basic density range of the image. The three waveform outputs of the waveform generator 70 are selected, after they are attenuated to equal levels, by activation of one of three transmission gates 90, 92 and 94 which are connected by a capacitor 96 to a level shifter operational amplifier 98 where they are amplified sufficiently to drive an offset buffer operational amplifier 100. A size control potentiometer 102 between amplifiers 98 and 100 is connected to the knob 22 to permit a user to vary the size of the image on disk M from a point to well over the size of the disk member M. A position control potentiometer 104 at the input to amplifier 100 is connected to the knob 20 to permit a user to start the image at any position on the light emitting array L on the disk member M by adjusting the input level to the summing input of amplifier 100. The amplifiers 98 and 100 also receive a negative voltage input supply from an inverter circuit 106 and a rectifier circuit 108 permitting a user to select a starting point for the image at any selected one of the light emitting diodes L on the disk member M, and also supplying necessary operating power to the amplifiers. The function signal output of the amplifier 100 specifying the pattern, shape, density, size and location of the image to be formed is provided to the contact 48 for connection to the decoder circuit D via slip contact 42.

The touch control circuit 60 (FIG. 2) includes two banks of multi-input set-reset flip flops, a bank 110 (FIG. 4) connected to the touch contacts 26, 28 and 30 and the transmission gates 84, 86 and 88, and a bank of like configuration to the bank 110 connected between the contacts 32, 34 and 36 and the transmission gates 90, 92, and 94 of FIG. 3. Since the two banks of flip-flops are of like construction and function, only the bank 110 is shown in the drawings.

In the flip-flop bank 110 of the touch control circuit 60, (FIG. 4), an input biasing network 112 is electrically connected to provide operating voltage. The touch contact 26 is electrically connected to the bias network 112 and to a set gate 114 of a flip-flop or bistable circuit 116 of the bank 110, a reset gate 118 of a flip-flop 120 of the bank 110 and a reset gate 122 of a flip-flop 124 of the bank 110. The touch contact 28 is electrically connected to bias network 112 and to a reset gate 126 of flip-flop 116, a set gate 130 of the flip-flop 120 and reset gate 122 of flip-flop 124. Touch contact 30 is electrically connected to reset gates 126 and 118 and to a set gate 132 of flip-flop 124.

Upon activation of the apparatus A, biasing network 112 provides a power-on reset to the bank 110 and necessary high impedance bias to the touch contacts 26, 28 and 30. Under normal (resting) condition this renders the inputs to the flip-flops 116, 120 and 124 inactive and the flip-flops retain the state of the most recent change. When a user's finger touches one of the touch contacts 26, 28 or 30, a noise voltage appears across a protection resistor 134, 136 or 138, respectively, setting the set gate of the flip-flop associated with the touch contact which has been touched by the user and resetting the other two flip-flops of the bank 110. The three flip-flops 116, 120 and 124 remain in this state, one set and two reset, until a different one of the touch contacts 26, 28 or 30 is touched by a user.

The analog transmission gates 84, 86 and 88 (FIG. 3) of the function generator 50 are connected at the outputs of flip-flops 116, 120 and 124 respectively so that the function generator 50 receives an electrical indication as to which of the touch contacts 26, 28 or 30 has been contacted by a user to specify the basic density range of the image. Buffer inverters 116A, 120B and 124C electrically connect the outputs from flip-flops 116, 120 and 124 to light-emitting or indicator diodes 140, 142 and 144, respectively, mounted at a suitable location on the housing 10 to indicate which setting of the touch contacts 26, 28 and 30 is currently being provided to the function generator circuit 50 to specify the density of the image being formed by the apparatus A.

As has been set forth above, the other bank of flip-flops in touch control circuit 60 functions in a like manner to the bank 110, transferring control functions from the touch contacts 32, 34 and 36, in response to contact by a user, to the transmission gates 90, 92 and 94 in the function generator to control the basic shape of the image being formed. Indicators 140A, 142B and 144C operating in a like manner to indicators 140, 142 and 144, respectively are provided to indicate which of touch contacts 32, 34 and 36 is providing an input signal to the function generator circuit 50.

The sync circuit 58 (FIG. 5) includes a photoelectric pickup tachometer circuit 146 which is connected to the output shaft of the motor 54 which rotates the disk member M. An optical interrupter on the shaft produces light pulses which are sensed by a phototransistor 148 and fed to a phase locked loop 150. The pulses from phototransistor 148 are compared in the phase locked loop 150 with pulses received from terminal 72 of the function generator circuit 50 after they are conditioned in a unijunction transistor oscillator circuit 152. Oscillator circuit 152 provides narrow pulses required for flip-flop 156 performing phase comparison and also allows multiple frequency locking which makes possible the production of multiple stable designs by the light emitters L as determined by sync control 18 setting.

Both flip-flops 154 and 156 are normally reset so that their Q outputs are low. An input pulse on one of the input lines to the flip-flop 154 or 156 causes that particular flip-flop Q output to go high. Similarly, a pulse on the input to the other flip-flop will set the Q output high. With both flip-flops so clocked to have their Q outputs high, a reset delay line 158 becomes active and resets both flip-flops to their initial conditions, ready for the next set of pulses from the waveform generator 70 and the tachometer 146. The time lapse between the two flip-flops being so clocked determines the duty cycle of the pulse train seen by an active integrator 160. The integrator 160 includes two transmissive gates 162 and 164 arranged so that they may charge or discharge a capacitor 166. The gate 162 when blocked permits current to flow through a diode 170 to charge the capacitor 166 and when open provides a high impedance to the capacitor 166 hindering discharging. The gate 164 when open drains the charge stored on capacitor 166 to electrical ground. The charge on the capacitor is thus proportional to the width of the pulses formed by flip-flops 154 and 156 and which pulse from these flip-flops is leading or lagging the other. As these pulses approach each other in time, the duty cycle seen by the integrator 160 becomes smaller. When the two inputs are in phase, the duty cycle is zero, and the analog output of the integrator 160 will remain stable. The voltage on integrator 160 from the stored charge on capacitor 166 is provided at a terminal 168 to the motor control circuit 56 to control the motor speed or function generator frequency so that the design formed by light emitters L will appear stable and be locked on the disk member M.

The motor controller 56 (FIG. 6) includes a power bridge amplifier 170 with outputs of amplifiers 172 and 174 connected to the motor 54. The amplifiers 172 and 174 are controlled by a switch 18A, which is controlled by knob 18, (FIGS. 2 and 5) being moved to an opposite position from that shown in FIG. 6 to electrically connect the input signal from terminal 168 to the negative input of amplifier 172 and the positive input of amplifier 174 to allow control of synchronization between the motor 54 and the image displayed on disk members M. With the switch 18A (FIG. 6) in the position shown in the drawings, power bridge amplifier 170 does not receive the signal on terminal 168 and free running operation of the motor 54 is permitted. The positive input of amplifier 172 and the negative input of amplifier 174 are electrically connected to a potentiometer 178 whose resistance is controlled by the knob 14 on the housing 10 to control the speed at which the motor 54 rotates the disk member M and its direction. Preferably, turning of the knob 14 clockwise causes clockwise rotation of the disk member M, while counter-clockwise rotation of disk member M results from corresponding rotation of knob 14.

Turning now to the decoder circuit D (FIG. 7), the slip rings 38, 40 and 42 provide electrical connections in the manner set forth in the chart above. A multiple-tapped voltage divider 180, in the form of a series of resistors, is electrically connected to the ground slip ring 38. Slip ring 42 (FIG. 7) receives the function control output signal from the function generator circuit 50. Different taps of the voltage divider 180 (FIG. 7) are electrically connected to various inputs of decoders 182 and 184 which are multiple voltage sensitive comparators. As has been set forth, the output amplitude of the signal from function generator circuit 50 is varied according to the desired image or pattern to be formed on the disk member M. The comparator decoders 182 and 184 electrically sense the magnitude of this signal and activate a particular one, or group, of the light-emitting diodes.

In the operation of the present invention a user adjusts the desired ones of the knobs 14, 16, 18, 20, 22 and 24 as well as touch contacts 26, 28, 30, 32, 34 and 36 based on the pattern, size shape, position and density of the image to be formed.

The outputs of the decoders D on the disk M light the light emitting elements L selectively with each light energized representing some increment of output voltage from the function generator 50. The light emitting array L is arranged so that as the amplitude increases or decreases a moving dot of light can be made to appear to move up or down the light emitting array L on the disk M. Thus, the voltage amplitude from the function generator 50 is converted to an apparent moving dot of light on the disk member M. The position of the dot is directly related to the function generator amplitude, time interval, offset voltage, and wave shape.

On the rotating disk member M, the array of light emitters L, the function being generated by the function generator 50 is displayed in a polar coordinate system, allowing a user to generate an almost limitless series of kinetic types of designs.

The following chart sets forth, for example, several types of designs which may be formed for certain settings of the knobs on the housing 10:

| Function Gen Waveform Period Points Control (Knob 24) and Transmission Gates Touch Contacts (26, 28, 30) TIME TF | Rotation Period of Disk M Speed/ Direction Control (Knob 14) TIME TR* | Amplitude Size Control (Knob 22) Voltage VA | Offset Voltage Position Control (Knob 20) Voltage Vo | Phase Lock/ Free Run Control (Knob 18) | Symmetry of Waveform Erase Control (Knob 16) Voltage VE | Wave Shape Sine Triangular Square Control Transmission Gates Touch Contacts (32, 34, 36) | Basic Class of Design Type Produced |
|---|---|---|---|---|---|---|---|
| any value | SEE NOTE BELOW | O | Vo | N/A | N/A | N/A | Circle of varying size determined by Vo control setting |
| TF = TR | TR = TF | VA | Vo | In lock | 1/1 | Square | Stationary concentric half circles of varying size and position determined by VA, and Vo, |

-continued

| Function Gen Waveform Period Points Control (Knob 24) and Transmission Gates Touch Contacts (26, 28, 30) TIME TF | Rotation Period of Disk M Speed/ Direction Control (Knob 14) TIME TR* | Amplitude Size Control (Knob 22) Voltage VA | Offset Voltage Position Control (Knob 20) Voltage Vo | Phase Lock/ Free Run Control (Knob 18) | Symmetry of Waveform Erase Control (Knob 16) Voltage VE | Wave Shape Sine Triangular Square Control Transmission Gates Touch Contacts (32, 34, 36) | Basic Class of Design Type Produced |
|---|---|---|---|---|---|---|---|
| TF < TR | TR > TF | VA | 0 | In lock | 1/1 | Sine(90) Triangular(92) Square(94) | (90)Stationary leaf design with round end points, size determined by VA (92)Stationary leaf design with pointed end points, size determined by VA (94)Stationary leaf design with flat end points, size determined by VA |
| TF < TR | TR > TF | VA | Vo | In lock | 1/1 | Sine(90) Triangular(92) Square(94) | Same as above example except for 50% of leaves smaller and 50% larger leaves concentric arranged or alternating arrangement determined by TF and TR ratio |
| TF < TR | TR > TF | VA | 0 | In lock | VE | Sine(90) Triangular(92) Square(94) | (90)Stationary leaf design with round ends and asymmetrical sides determined by VE (92)Stationary leaf design with pointed ends and asymmetrical sides determined by VE (94)Stationary leaf design with flat ends and asymmetrical sides determined by VE |
| TF < TR | TR > TF | VA | Vo | Free run | 1/1 | Sine(90) Triangular(92) Square(94) | Rotating petal designs with many possible variations and visual illusions depending on phase and TF, TR ratio, Vo and size determined by VA |

*NOTE:
Rotation period (TR) must be less than human visual persistence.
The offset voltage Vo is calibrated so that when it is at zero, no lighting elements L are energized. Any variation in amplitude above or below a certain value will cause the lighting elements L on one side or the other of the center disk member M to become energized.

Since there are many possible combinations of variables affecting the type of design produced (frequency, amplitude, wave shape, offset voltage, symmetry, ratio of frequency to rotation period, and phase), a virtually limitless variety of designs can be produced.

As the disk member M rotates, the specified ones of the light emitters L are energized to form the image by changing the settings of the knobs and touch controls, a virtually limitless number of images may be formed. The present invention thus provides light images electronically which have an appeal and interest to a user similar in nature to that provided by kaleidoscopes, and may thus be thought of as an electronic kaleidoscope. Also, since the image may be varied and adjusted to form a large number of appealing displays, the problem of a fixed routine of images becoming boring to a user is overcome.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:
1. An electronic display apparatus, comprising:
(a) a disk member;
(b) a plurality of light emitting means mounted with said disk member;
(c) means for rotating said disk member; and
(d) electronic control circuit means for selectively activating said plurality of light emitting means to selectively form differing visual images for viewing, said circuit means comprising:
   (1) input means for forming an electronic control signal defining the pattern, position, size and shape of the visual images to be formed as specified by a user; and
   (2) decoder means for decoding the electronic control signals to selectively activate said plurality of light emitting means to form the specified visual images.
2. The apparatus of claim 1, wherein:
said decoder means is mounted on said disk member with said plurality of light emitting means.
3. The apparatus of claim 1, wherein said input means further includes:
means for adjusting the pattern of the image formed by said plurality of light emitting means.
4. The apparatus of claim 1, wherein said input means further includes:
means for adjusting the position of the image formed by said plurality of light emitting means.

5. The apparatus of claim 1, wherein said input means further includes:
   means for adjusting the size of the image formed by said plurality of light emitting means.

6. The apparatus of claim 1, wherein said input means further includes:
   means for adjusting the shape of the image formed by said plurality of light emitting means.

7. The apparatus of claim 1, wherein said input means further includes:
   means for adjusting the density of the image formed by said plurality of light emitting means.

8. The apparatus of claim 1, further including:
   means for controlling the speed of rotation of said disk member.

9. The apparatus of claim 1, further including:
   means for synchronizing the rotation of said disk member with the specified visual image.

* * * * *